United States Patent
Jo et al.

(10) Patent No.: US 7,411,983 B2
(45) Date of Patent: Aug. 12, 2008

(54) APPARATUS AND METHOD FOR ACQUIRING FRAME SYNCHRONIZATION IN A MOBILE COMMUNICATION SYSTEM

(75) Inventors: Chul-Ho Jo, Songnam-shi (KR); Joon-Dong Lee, Kwachon-shi (KR); Kwang-Sung Yang, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 955 days.

(21) Appl. No.: 10/212,543

(22) Filed: Aug. 5, 2002

(65) Prior Publication Data
US 2004/0022273 A1 Feb. 5, 2004

(51) Int. Cl.
*H04J 3/06* (2006.01)
(52) U.S. Cl. .................................. 370/503; 714/758
(58) Field of Classification Search ............ None
See application file for complete search history.

(56) References Cited

U.S. PATENT DOCUMENTS

| | | | |
|---|---|---|---|
| 6,775,242 B2 * | 8/2004 | Grilli et al. | 370/252 |
| 7,095,727 B2 * | 8/2006 | Kim et al. | 370/335 |
| 2002/0142778 A1 * | 10/2002 | Saito | 455/450 |
| 2003/0139140 A1 * | 7/2003 | Chen et al. | 455/67.1 |
| 2003/0207696 A1 * | 11/2003 | Willenegger et al. | 455/522 |

* cited by examiner

*Primary Examiner*—Huy D. Vu
*Assistant Examiner*—Toan Nguyen
(74) *Attorney, Agent, or Firm*—The Farrell Law Firm, PC

(57) ABSTRACT

Disclosed is a method for acquiring frame synchronization of a broadcasting channel (BCH) in an asynchronous mobile communication system. The method comprises acquiring system timing through a synchronization channel; performing CRC by demodulating for a predetermined time duration a primary common control physical channel (PCCPCH) based on the system information, re-designating a demodulating duration according to the CRC result, and performing CRC; and acquiring frame synchronization of the BCH when the CRC is consecutively passed at least two times.

15 Claims, 6 Drawing Sheets

APPARATUS AND METHOD FOR ACQUIRING FRAME SYNCHRONIZATION IN A MOBILE COMMUNICATION SYSTEM

BACKGROUND OF THE INVENTION

1. Field of the Invention

The present invention relates generally to a mobile communication system, and in particular, to an apparatus and method for acquiring frame synchronization in an asynchronous mobile communication system.

2. Description of the Related Art

The invention will be described herein with reference to a UMTS/3GPP (Universal Mobile Telecommunication System/3$^{rd}$ Generation Partnership Project) system, a next generation asynchronous mobile communication system. The 3GPP specification is silent as to the implementation of frame synchronization of a broadcasting channel (BCH). Herein, a description will be made as to a process of acquiring 10 msec-frame synchronization through initial cell search by a UE (User Equipment) in a UMTS system.

FIG. 1 illustrates a scheme for transmitting a primary synchronization channel (PSCH), a secondary synchronization channel (SSCH), and a common pilot channel (CPICH). Referring to FIG. 1, a UTRAN (UMTS Terrestrial Radio Access Network) transmits a primary synchronization code (PSC) $C_P$ for ¹⁄₁₀ period (i.e., 256 chips) at each slot of the primary synchronization channel. A UE then receives the primary synchronization code $C_P$ and synchronizes UTRAN time slots based on the received primary synchronization code $C_P$. This is referred to as Cell Search Step #1.

The secondary synchronization channel is mapped with code group information $C_s^{t,1}$-$C_s^{t,15}$ of the UTRAN before being transmitted. After being time slot synchronized in Cell Search Step #1, the UTRAN detects the code group information and 10 msec-frame synchronization through the secondary synchronization channel. Here, the code group information of the UTRAN, information used to determine a code group to which the UTRAN belongs, is designated according to comma-free codes obtained by selectively combining 15 synchronization codes among 16 synchronization codes SSC1-SSC16. This is referred to as Cell Search Step #2.

As described above, the UE acquires 10 msec-frame synchronization through the initial cell search. Thereafter, the UE must rapidly demodulate a broadcasting channel (BCH) in order to quickly start a service. However, prior to demodulating the BCH the UE has acquired only 10 msec-radio frame synchronization of the PCCPCH (Primary Common Control Physical Channel), but has not recognized synchronization for 20 msec-frame demodulation of the BCH. In this state, if the UE demodulates the 10 msec-radio frame of the PCCPCH using a transmission time interval 20 msec (TTI) of the BCH and provides the demodulated frame to an upper layer, it is not assured that the 20 msec duration is time-aligned (or synchronized) with a 20 msec boundary of the BCH. A failure to align a first frame boundary causes transmission of erroneously demodulated data to the upper layer. One problem that arises is that in the case of an unsynchronized frame boundary, if user data existing in a cyclic redundancy check (CRC) position becomes equal to the CRC result, the UE will mistake the user data for normal data and transmit it to the upper layer.

SUMMARY OF THE INVENTION

It is, therefore, an object of the present invention to provide an apparatus and method for rapidly demodulating a broadcasting channel (BCH) by a UE after cell search in an asynchronous mobile communication system.

It is another object of the preset invention to provide an apparatus and method for acquiring frame synchronization of a BCH in an asynchronous mobile communication system.

It is further another object of the present invention to provide an apparatus and method for acquiring frame synchronization of a BCH by distinguishing (SFN modulo 2) of a PCCPCH (Primary Common Control Physical Channel) at Layer 1 in an asynchronous mobile communication system. SFN being the single frequency network.

In accordance with one aspect of the present invention, there is provided a UE (User Equipment) apparatus in an asynchronous mobile communication system. The UE apparatus comprises a demodulator for demodulating a primary common control physical channel (PCCPCH) based on timing acquired through a synchronization channel for a predetermined time duration, and performing a CRC (Cyclic Redundancy Check), and a controller for re-designating the predetermined time duration according to the CRC result from the demodulator, and acquiring frame synchronization of a BCH (Broadcasting Channel) when the CRC passes at least two consecutive times.

In accordance with another aspect of the present invention, there is provided a method for acquiring frame synchronization of a broadcasting channel (BCH) in an asynchronous mobile communication system. The method comprises acquiring system timing through a synchronization channel; performing CRC by demodulating a primary common control physical channel (PCCPCH) based on the system information for a predetermined time duration, re-designating a demodulating duration according to the CRC result, and performing CRC; and acquiring frame synchronization of the BCH when the CRC passes at least two consecutive times.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In a preferred embodiment of the present invention, Layer 1 identifies (SFN modulo 2) of a PCCPCH (Primary Common Control Physical Channel) in order to demodulate system information on the BCH as quickly as possible SFN is the single frequency network. Namely, the present invention performs CRC on a transport block in a channel codec, accumulates the CRC result in a CRC counter CRC_count, and determines the success of the identification based on the accumulated result. That is, Layer 1 previously identifies a correct information frame of the BCH, and transmits it to the upper layer, thus making it possible to prevent unnecessary signaling with the upper layer, which may occur upon BCH frame synchronization failure, thereby reducing a processing time.

Figure 1:
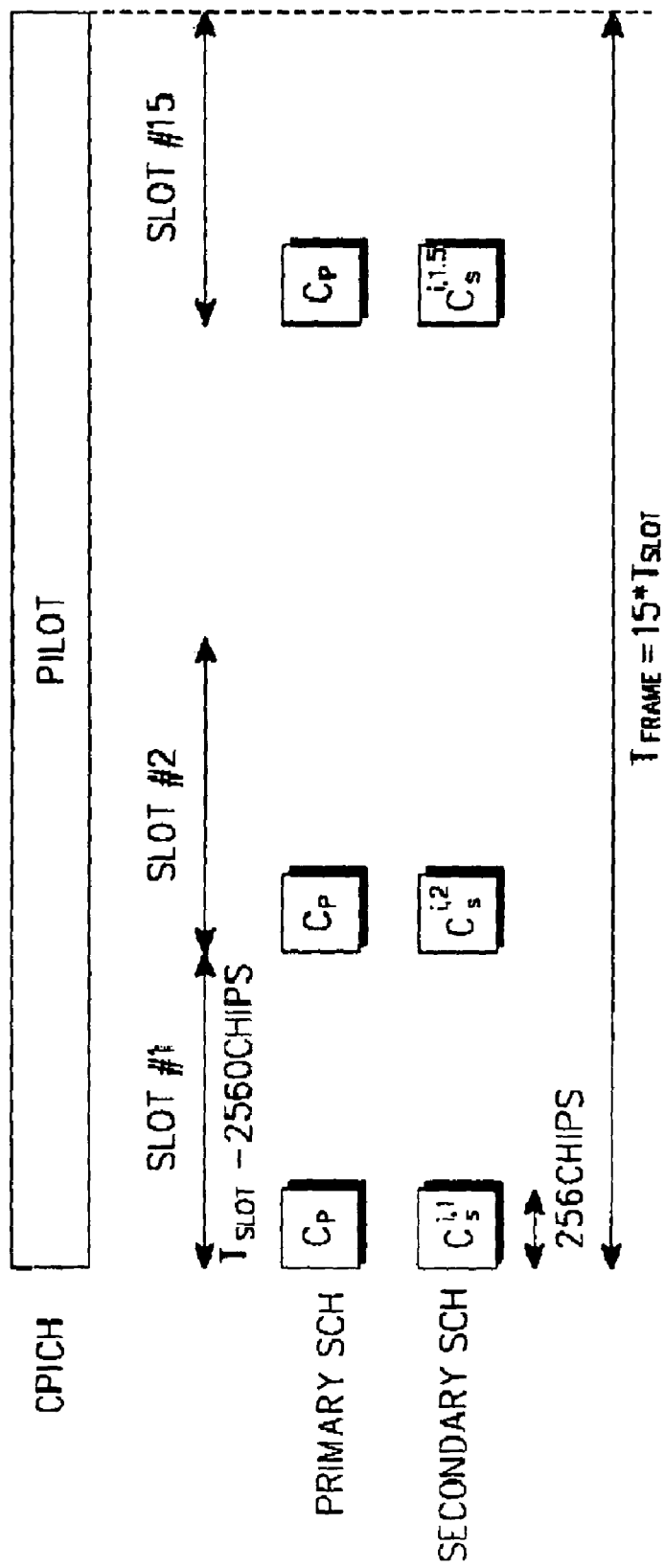
FIG. 1 illustrates timing of synchronization channels and a common pilot channel, related to initial cell search by a UE in a mobile communication system.
Figure 2:
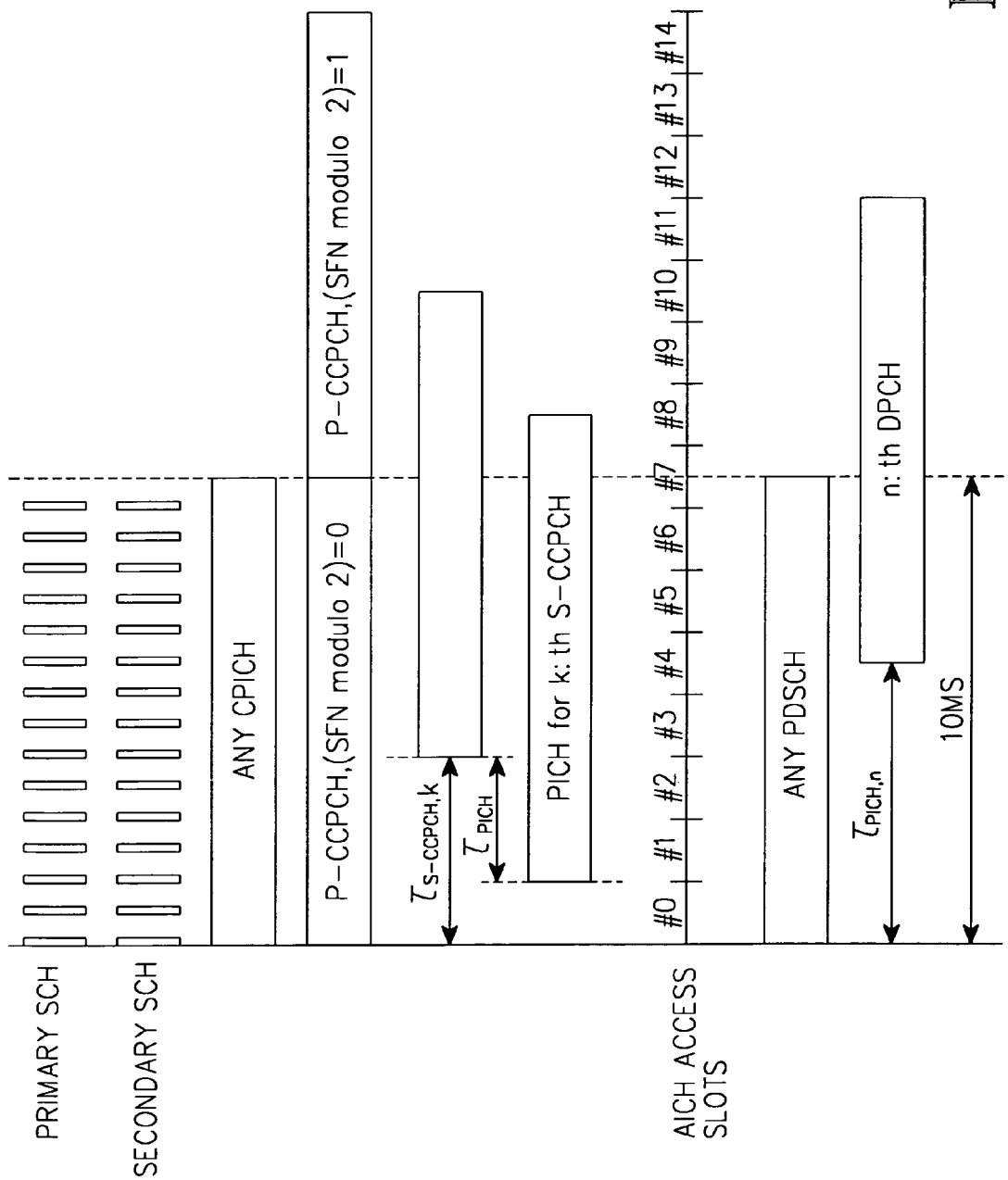
FIG. 2 illustrates frame timing of downlink physical channels in a mobile communication system according to an embodiment of the present invention.

FIG. 2 illustrates frame timing of downlink physical channels in a mobile communication system according to an embodiment of the present invention. As illustrated in FIG. 2, a primary synchronization channel (PSCH), a secondary synchronization channel (SSCH), a common pilot channel (CPICH), a primary common control physical channel (PCCPCH), and a physical downlink shared channel (PDSCH) have the same frame timing. Here, as mentioned before, the synchronization channels and the common pilot channel are used for the initial cell search.

Although the secondary common control physical channels (SCCPCHs) may have different timings, they have an offset of multiple times a 256-chip length from the PCCPCH frame timing. For example, $\tau_{SCCPCH}$=Tk×256 chips, where Tk $\in$ {0, 1, ..., 149}. PICH (Paging Indication Channel) timing goes $\tau_{PICH}$=7680 chips ahead of the SCCPCH frame timing.

An access slot #0 of an acquisition indication channel (AICH) starts at the same timing as the PCCPCH frame with (SFN modulo 2)=0. There exist 15 access slots #0-#14 in a one-frame duration. The PDSCH timing is related to DPCH (Dedicated Physical Channel) timing. Although the DPCHs may have different timings, they have an offset of multiples of a 256-chip length from the PCCPCH frame timing. For example, $\tau_{DPCH}$=Tn×256 chips, where Tn $\in$ {0, 1, ..., 149}.

Shown in Table 1 is a transport format of the BCH.

TABLE 1

| Dynamic Part | Transport Block Size | 246 |
|---|---|---|
|  | Transport Block Set Size | 246 |
| Semi-Static Part | TTI (Transmission Time Interval) | 20 msec |
|  | Channel Coding Type | Convolutional Code |
|  | Coding Rate | ½ |
|  | CRC Size | 6 |

First, the UE acquires initial synchronization through the primary synchronization channel PSCH, the secondary synchronization channel SSCH and the common pilot channel CPICH, and acquires downlink synchronization with the UTRAN by performing finger allocation for multi-path tracking. Thereafter, in order for a user of the UE to be provided with the service as quickly as possible, the UE should acquire cell specific information as rapidly as possible. However, the cell specific information is included in the broadcasting channel.

That is, the UE synchronizes its timing with the downlink timing through the downlink broadcasting channel, and then acquires information related to the uplink common control physical channel (CCPCH). Meanwhile, the broadcasting channel is carried by the PCCPCH. The UE demodulates the 10 msec-radio frame of the PCCPCH for 20 msec (=TTI of BCH), and continuously transmits the demodulated frame to the upper layer for a period equal to the transport block size.

Figure 3:
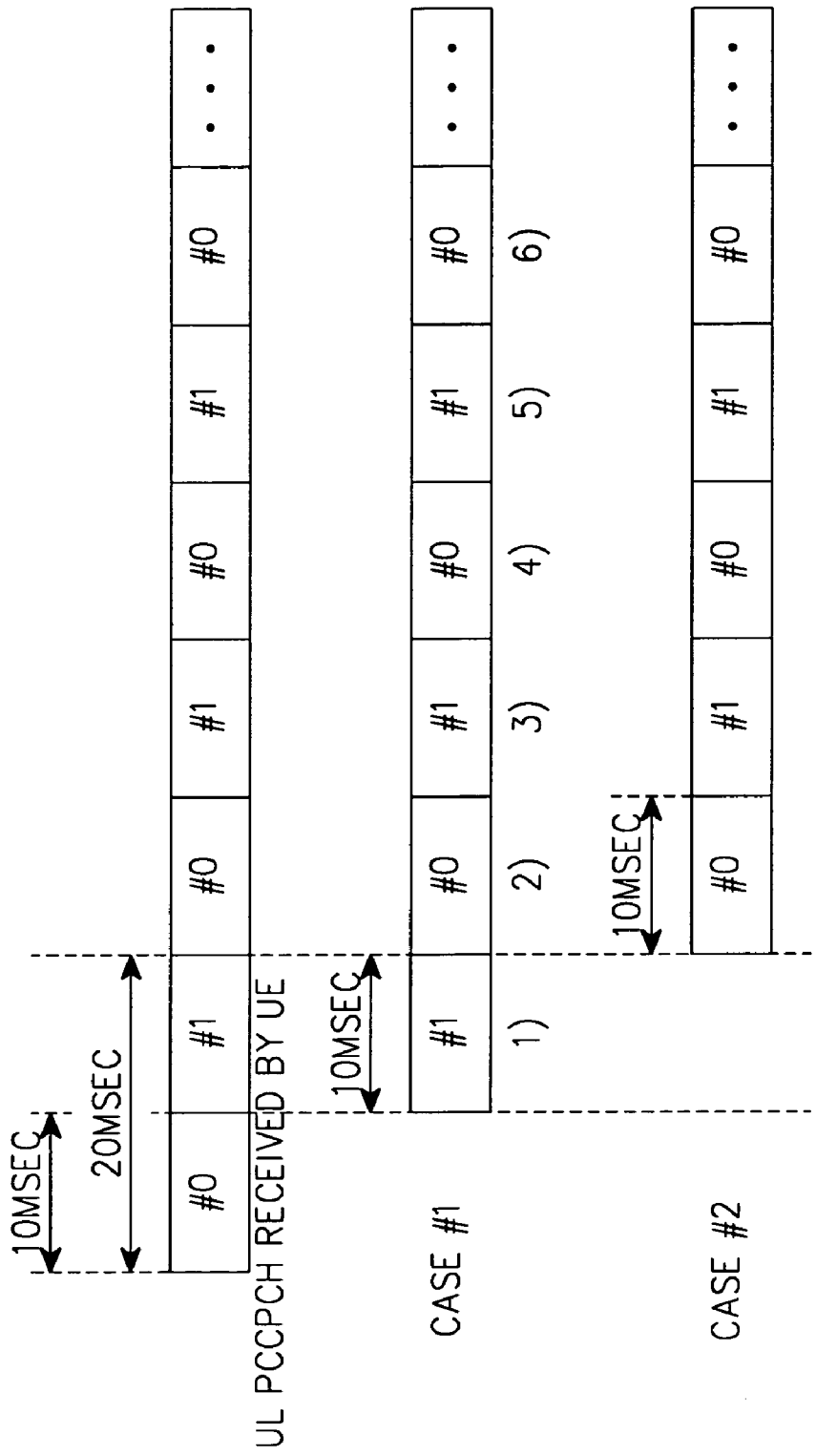
FIG. 3 illustrates timing relations between a transmitter and a receiver for a downlink PCCPCH.

However, in the present state, only 10 msec-frame synchronization of the PCCPCH is acquired for the BCH frame synchronization, so the UE cannot recognize the 20 msec boundary of the BCH transmitted by the UTRAN. For reference, #0 represents a first 10-msec-frame of the BCH, and #1 represents the next 10-msec-frame. state is illustrated in FIG. 3. For reference, #0 represents a first 20 msec-frame of the BCH, and #1 represents the next 20 msec-frame.

In Case #1, even though the 10 msec-frame boundary is not time-aligned, the UE continuously demodulates the BCH while expecting that PCCPCH frame #1 from the UTRAN is frame #0. As a result, the UE transmits wrong data to the upper layer. In Case #2, the UE can correctly demodulate the BCH frame from the UTRAN.

Since the BCH, as illustrated in Table 1, is comprised of one transport block, a transmitter adds only one CRC at the tail of the transport block for 20 msec. Therefore, a CRC error occurs at a receiver when a received PCCPCH frame is not time-aligned with the BCH transport block as in Case #1. However, in Case #2, the CRC will pass. The two cases are well illustrated in FIG. 4.

Figure 4:
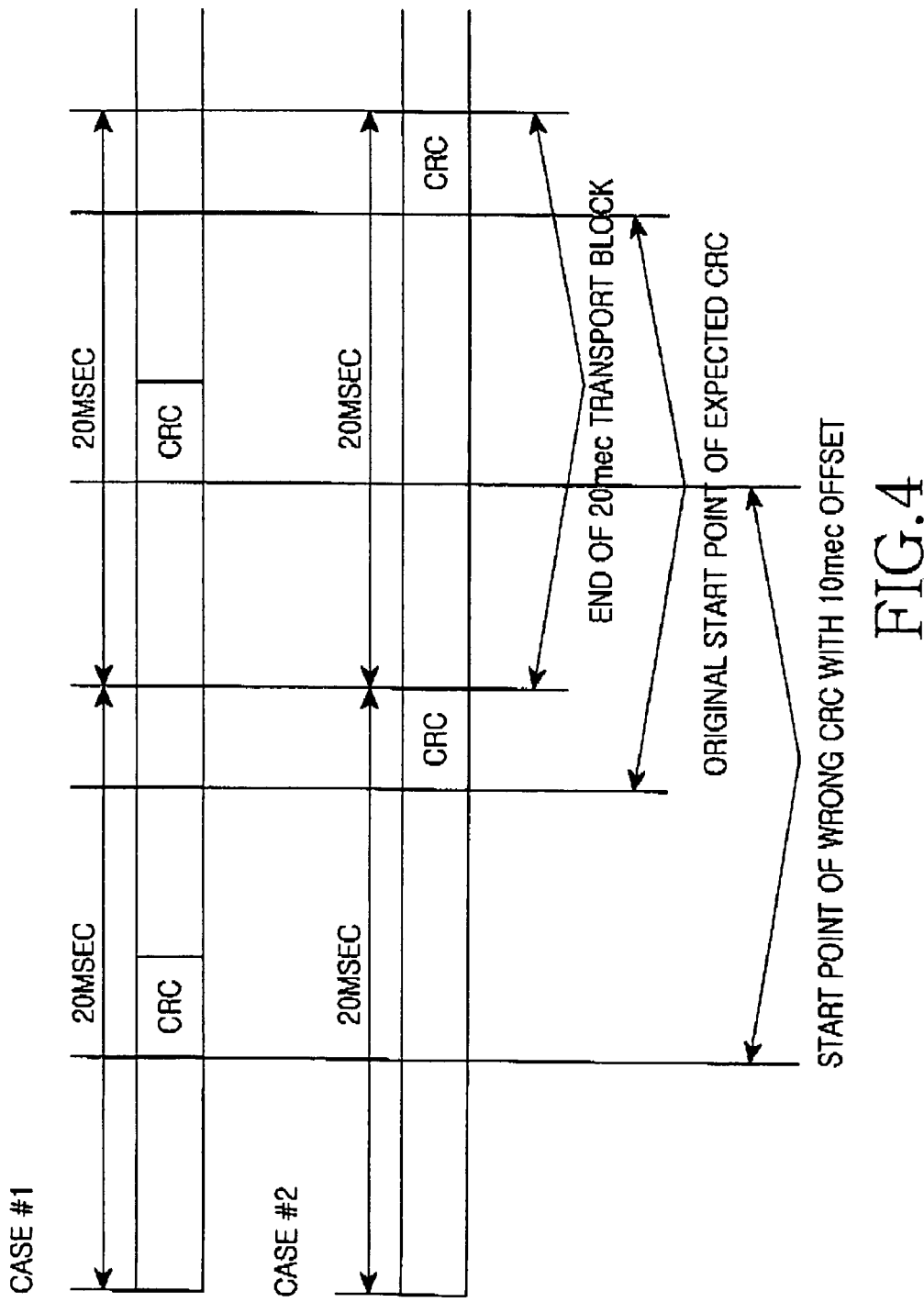
FIG. 4 illustrates transport blocks and CRC positions of a BCH.

As illustrated in FIG. 4, Case #1 shows a state where the CRC error occurs since the 20 msec demodulation duration is not time-aligned with the transport block of the BCH, and Case #2 shows a state where the CRC passes since the 20 msec demodulation duration is time-aligned with the transport block of the BCH. That is, the present invention proposes a scheme for correctly acquiring frame synchronization of the BCH by correctly distinguishing the above two cases.

Figure 5:
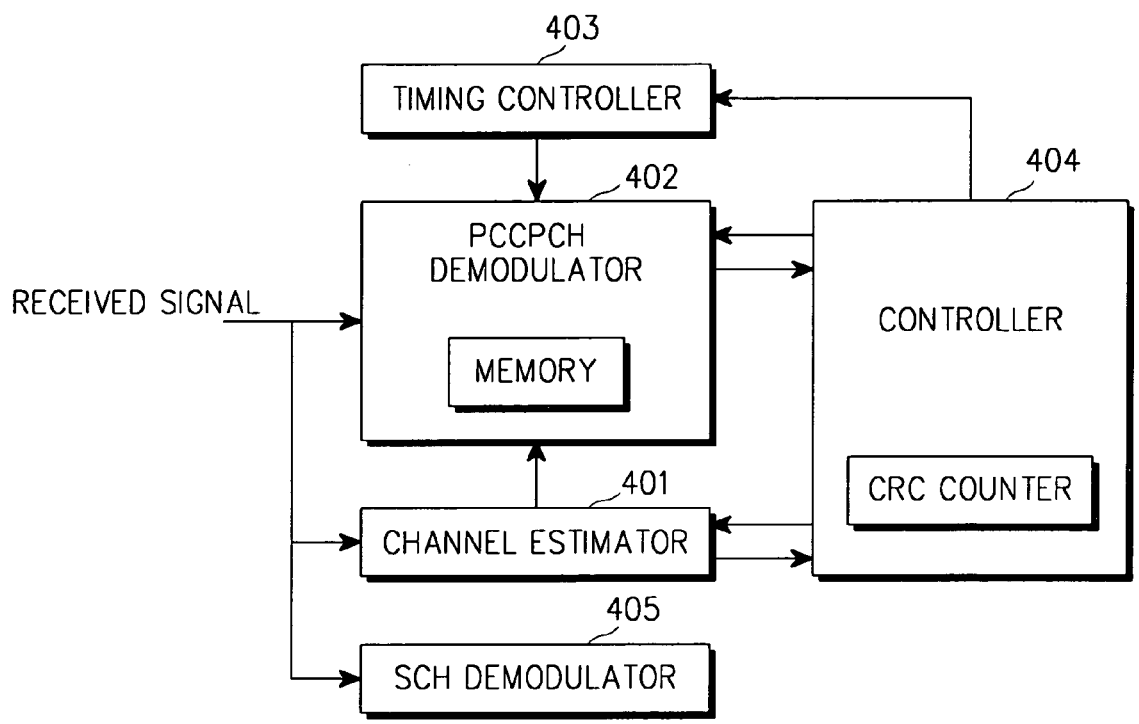
FIG. 5 illustrates a frame synchronization acquisition apparatus in a mobile communication system according to an embodiment of the present invention.

FIG. 5 illustrates a frame synchronization acquisition apparatus according to an embodiment of the present invention. Referring to FIG. 5, a channel estimator 401 estimates a fading component of a downlink path by demodulating a pilot channel. A synchronous channel (SCH) demodulator 405 acquires 10 msec-frame synchronization and code group information through the initial cell search process mentioned above, and provides the acquired information to a controller 404.

A PCCPCH demodulator 402 includes a memory for processing a received signal on an off-line basis, i.e. not on a real-time basis. The PCCPCH demodulator 402, under the control of a timing controller 403, demodulates 20 msec duration on the PCCPCH using a fading coefficient provided from the channel estimator 401, performs CRC and provides the CRC result to the controller 404.

The controller 404 provides the timing controller 403 with the timing (10 msec-frame synchronization) acquired through the initial cell search. Further, the controller 404 accumulates the CRC results from the PCCPCH demodulator 402 in a CRC counter, and determines acquisition of the frame synchronization based on the counter value. If it is determined that the frame synchronization is acquired, the controller 404 demodulates the BCH using the acquired frame synchronization, and transmits the demodulated BCH to the upper layer. The timing controller 403 controls demodulation duration of the PCCPCH demodulator 402 based on the timing information provided from the controller 404.

For example, the PCCPCH demodulator 402 performs demodulating assuming the 20 msec duration of the received signal stored in the memory, determined by the timing controller 403, as a transport block of the BCH. Thereafter, the PCCPCH demodulator 402 performs CRC and provides the CRC result to the controller 404. If the CRC passes, the controller 404 increases the CRC counter and demodulates the next 20 msec duration succeeding the above 20 msec duration. If the CRC fails, the PCCPCH demodulator 402 discards the leading 10 msec duration of the above 20 msec duration, and demodulates the next 20 msec duration. Thereafter, the PCCPCH demodulator 402 performs CRC and provides the CRC result to the controller 404. In the meantime, if a value of the CRC counter becomes '2', the controller 404 considers that 20 msec-frame synchronization is acquired, demodulates the BCH using the acquired frame synchronization, and then transmits the transport block to the upper layer.

Figure 6:
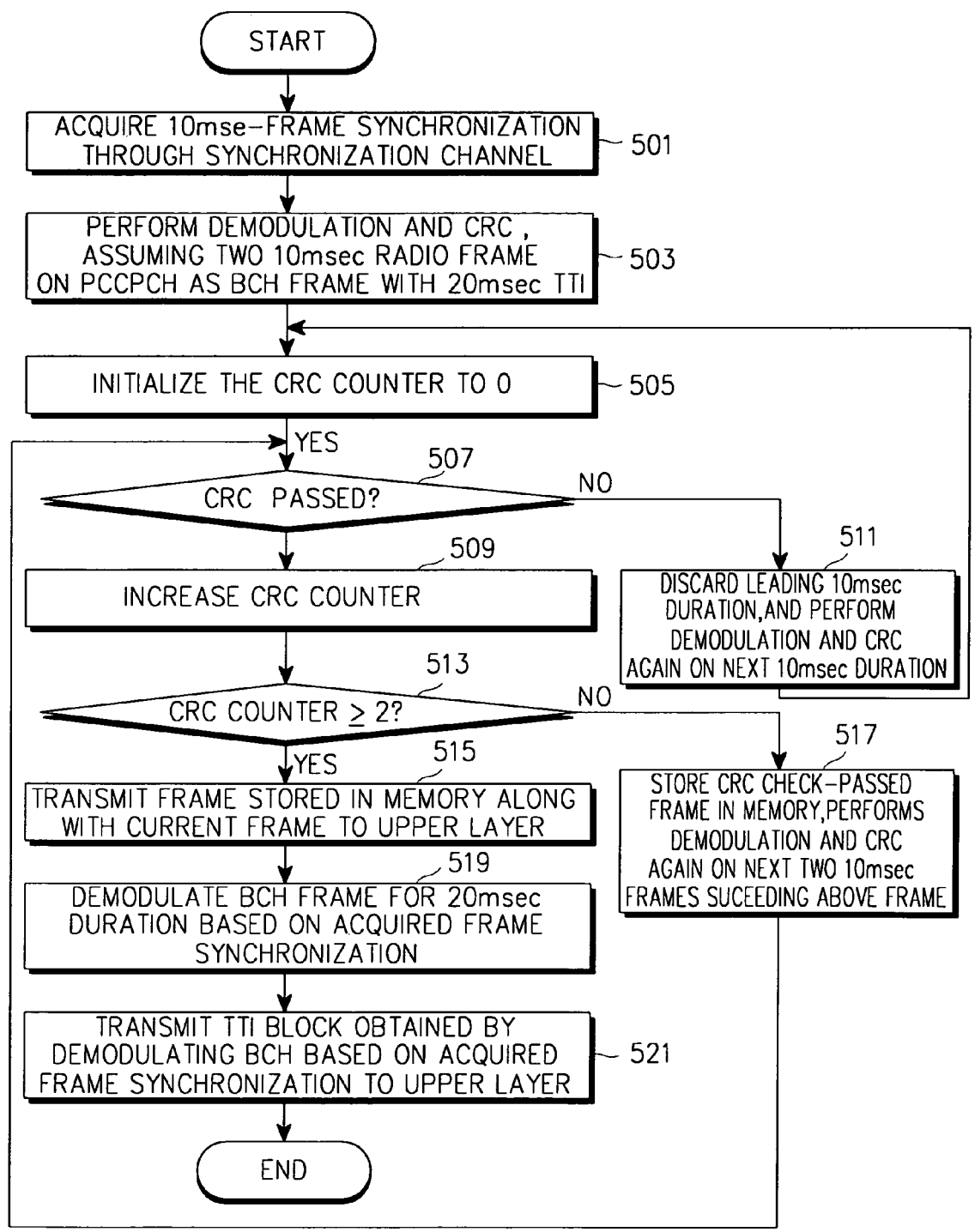
FIG. 6 illustrates a procedure for acquiring frame synchronization in a mobile communication system according to an embodiment of the present invention.

FIG. 6 illustrates a procedure for acquiring frame synchronization in a UMTS system according to an embodiment of the present invention. Referring to FIG. 6, in step 501, the UE acquires 10 msec-frame synchronization by demodulating the primary synchronization channel and the secondary synchronization channel. In step 503, the UE performs demodulation and CRC, assuming two 10 msec radio frames on the PCCPCH as a BCH frame with a 20 msec TTI. In step 505, the UE initializes the CRC counter to '0'.

Thereafter, in step 507, the UE determines whether the CRC passes. If the CRC passes, the UE proceeds to step 509. However, if the CRC fails, the UE proceeds to step 511. If the 20 msec duration is the radio frame duration of the BCH, the CRC will pass. Otherwise, a CRC error will occur.

In step 511, the UE discards the PCCPCH radio frame in the leading 10 msec duration of the 20 msec duration where the CRC error occurred, and thereafter, performs demodulation and CRC again on the following 10 msec duration. The UE then returns to step 505 where it deletes the frame stored in the memory, initializes the CRC counter, and again performs the succeeding steps.

Meanwhile, if the CRC passes, the UE increases the CRC counter by '1' in step 509, and determines in step 513 whether an increased value of the CRC counter is larger than '2'. If the value of the CRC counter is larger than '2', the UE proceeds to step 515. Otherwise, the UE proceeds to step 517. In step 517, the UE stores the CRC-passed frame in the memory, performs demodulation and CRC on the next two 10 msec frames succeeding the above frame, and then returns to step 507.

However, if the value of the CRC counter is larger than '2', the UE considers in step 515 that the frame synchronization is acquired. This means that the two PCCPCH radio frames in the previously demodulated 20 msec duration are time-aligned with a BCH frame duration of 20 msec TTI. The UE then transmits the frame stored in the memory (or buffer) along with the current frame to the upper layer in step 515, and demodulates the BCH frame for the 20 msec duration based on the acquired frame synchronization in step 519. Thereafter, in step 521, the UE transmits a TTI block obtained by demodulating the BCH based on the acquired frame synchronization to the upper layer. That is, Layer 1 continuously transmits to the upper layer the BCH information in sync with the acquired timing.

Of course, it is assumed herein that channel management is performed through different channels and the PCCPCH is maintained in a channel state where it can be demodulated. In addition, such a frame synchronization acquisition process is performed when BCH system information on the PCCPCH is first acquired after an initial cell search or in a handoff state, rather than performed at every frame.

As described above, in the UMTS mobile communication system according to the present invention, the UE can more rapidly acquire and more accurately achieve BCH frame synchronization during initial synchronization acquisition. As a result, it is possible to prevent unnecessary signaling with the upper layer, which may occur due to the failure of frame synchronization, and to reduce a system acquisition time, thereby providing the user with a more rapid service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for acquiring frame synchronization of a broadcasting channel (BCH) in an asynchronous mobile communication system, the method comprising:
   acquiring synchronization of a radio frame having a predetermined duration through a synchronization channel;
   decoding a predetermined position of the radio frame having the predetermined duration for a double duration and performing a Cyclic Redundancy Check (CRC) on the decoding result at a time that the synchronization is acquired wherein when the CRC fails, the CRC is performed by demodulating again from a succeeding 10 msec duration of the CRC 20 msec duration, increasing a CRC counter if the CRC passes, and then determining whether a value of the CRC counter is larger than 2 performing the CRC by demodulating the 20 msec duration after the CRC duration, when the value of the CRC counter is less than 2;
   acquiring frame synchronization of the BCH if the value of the CRC counter is larger than 2; and
   if the CRC is consecutively passed at least twice, adding up two frames received from the synchronization acquired time and decoding the added frames for one duration thereby acquiring synchronization of the BCH.

2. The method of claim 1, further comprising:
   if the CRC fails, redoubling the predetermined duration and performing the CRC again.

3. The method of claim 1, wherein the predetermined duration is 10 msec. and the double duration is 20 msec.

4. The method of claim 1, wherein the asynchronous mobile communication system comprises at least two layers including an upper layer and a lower layer.

5. The method of claim 4, wherein if the CRC check result indicates pass, the frame is transmitted from the lower layer to the upper layer.

6. The method of claim 4, wherein if the CRC result indicates Fail, the frame is not transmitted from the lower layer to the upper layer.

7. The method of claim 4, wherein the lower layer is a primary common control physical channel (PCCPCH) and the upper layer is a BCH.

8. An apparatus for acquiring frame synchronization of a broadcasting channel (BCH) in an asynchronous mobile communication system, comprising:
   a demodulator for, based on timing acquired through a synchronization channel, decoding a predetermined position of a radio frame having a predetermined duration for a double duration and performing a CRC check on the decoding result at a time that the synchronization is acquired wherein when the CRC fails, the CRC is performed by demodulating again from a succeeding 10 msec duration of the CRC 20 msec duration, increasing a CRC counter if the CRC passes, and then determining whether a value of the CRC counter is larger than 2 performing the CRC by demodulating the 20 msec duration after the CRC duration, when the value of the CRC counter is less than 2;
   acquiring frame synchronization of the BCH if the value of the CRC counter is larger than 2; and
   a controller for adding up two frames received from the synchronization acquired time and decoding the added frames for one duration thereby acquiring synchronization of the BCH, if the CRC check is consecutively passed at least twice.

9. The apparatus of claim 8, wherein if the CRC fails, the controller re-doubles the predetermined duration and performs the CRC again.

10. The apparatus of claim 8, wherein the predetermined duration is 10 msec. and the double duration is 20 msec.

11. The apparatus of claim 8, wherein the asynchronous mobile communication system comprises at least two layers including an upper layer and a lower layer.

12. The apparatus of claim 11, wherein if the CRC check is passed, the frame is transmitted from the lower layer to the upper layer.

13. The apparatus of claim 11, wherein if the CRC check is failed, the frame is not transmitted from the lower layer to the upper layer.

14. The apparatus of claim 11, wherein the lower layer is a primary common control physical channel (PCCPCH) and the upper layer is a BCH.

15. The apparatus of claim 8, wherein the controller comprises a CRC counter that increases a count value if the CRC check is passed, and acquires synchronization of the BCH if the count value of the CRC counter is greater than or equal to 2.

* * * * *